United States Patent
Okamoto et al.

(10) Patent No.: US 6,690,446 B1
(45) Date of Patent: Feb. 10, 2004

(54) COLOR LIQUID CRYSTAL DISPLAY PANEL, MANUFACTURING METHOD OF THE SAME, AND LIQUID CRYSTAL DISPLAY

(75) Inventors: Mamoru Okamoto, Tokyo (JP); Yuji Yamamoto, Tokyo (JP); Michiaki Sakamoto, Tokyo (JP); Hironori Kikkawa, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 09/689,901

(22) Filed: Oct. 13, 2000

(30) Foreign Application Priority Data

Oct. 15, 1999 (JP) .............................. 11-294073

(51) Int. Cl.[7] ................................................ G02F 1/13
(52) U.S. Cl. .................................................... 349/181
(58) Field of Search ................................ 349/138, 106, 349/181, 187

(56) References Cited

U.S. PATENT DOCUMENTS

| | | | | |
|---|---|---|---|---|
| 5,680,187 A | * | 10/1997 | Nagayama et al. | 349/110 |
| 5,682,218 A | * | 10/1997 | Shimizu et al. | 349/156 |
| 5,818,550 A | * | 10/1998 | Kadota et al. | 349/43 |
| 6,007,740 A | * | 12/1999 | Andou et al. | 252/299.63 |
| 6,211,928 B1 | * | 4/2001 | Oh et al. | 349/43 |
| 6,323,921 B1 | * | 11/2001 | Kurauchi et al. | 349/106 |

FOREIGN PATENT DOCUMENTS

| | | |
|---|---|---|
| JP | 6-214252 | 8/1994 |
| JP | 8-122824 | 5/1996 |
| JP | 9-292633 | 11/1997 |
| JP | 10-154817 | 6/1998 |
| KR | 93-4788 | 3/1993 |
| KR | 96-18709 | 6/1996 |

OTHER PUBLICATIONS

Wu, "Phase matched compensation films for liquids crystal displays", Materials Chemistry and Physics, pp. 163–168.*
Korean Office Action dated Aug. 30, 2002 with partial English translation.

* cited by examiner

Primary Examiner—Kenneth Parker
(74) Attorney, Agent, or Firm—McGinn & Gibb, PLLC

(57) ABSTRACT

In a color liquid crystal display panel of a CF-on-TFT structure having a black matrix and a color filter formed on a TFT substrate, reflected light is reduced by selecting and controlling a gap (d) of the CF-on-TFT panel and refractive index anisotropy (Δd) of a liquid crystal material by exploiting the presence of wavelength dependency between retardation (Δnd) and light transmittance so as to shift the wavelength of reflected light of external light from a pixel electrode ITO to a shorter wavelength side.

16 Claims, 9 Drawing Sheets

COLOR LIQUID CRYSTAL DISPLAY PANEL, MANUFACTURING METHOD OF THE SAME, AND LIQUID CRYSTAL DISPLAY

BACKGROUND OF THE INVENTION

1. Field of the Invention

The present invention relates to a color liquid crystal display panel and a manufacturing method of the same, and more particularly to a color liquid crystal display panel (hereinafter, referred to as CF-on-TFT panel) fabricated by forming a black matrix and a color filter on a TFT (Thin Film Transistor) substrate of the color liquid crystal panel made of a transparent insulating substrate having formed thereon a plurality of thin film transistors using amorphous silicon and a manufacturing method of the same. The present invention also relates to a liquid crystal display employing the CF-on-TFT panel as a color liquid crystal display panel.

2. Description of the Related Art

FIG. 1 is a cross section of a conventional liquid crystal display panel. As shown in the drawing, the conventional liquid crystal display panel is fabricated by laminating (1) a first substrate 1 (hereinafter, also referred to as TFT substrate) having switching elements such as TFTs (Thin Film Transistors) each composed of a gate electrode 2, a gate insulating film 4, a semiconductor layer 5, a source electrode 6, and a drain electrode 7, a wiring layer (not shown) for each of the electrodes 2, 6, and 7, a pixel electrode 12 in each pixel provided in a one-to-one correspondence to the TFT, a passivation film 8 covering all the foregoing components, an alignment film 18a, and a terminal 3 used as an electrical connection to an external circuit, and (2) a second substrate 16 having a black matrix 9, color filters 11R, 11G(not shown), and 11B respectively for three colors of R(Red), G(Green), and B(Blue), a transparent common electrode 17 such as ITO (Indium Tin Oxide), and an alignment film 18b to each other through a sealing material 19 applied at the circumference portion of the substrates 1 and 16, thereby assembling a panel with their respective film forming surfaces opposing each other and spherical spacers 20 being provided in between to maintain the gap between the substrates 1 and 16 at a constant distance, and filling a liquid crystal material 21 in the panel after baking the seal.

Known as a liquid crystal filling method for the liquid crystal material 21 are two-holes method and vacuum filling method. The former method comprises the steps of providing two holes through the panel at predetermined positions, and filling a liquid crystal material 21 in through one of the holes while evacuating the panel through the other, so that the liquid crystal material 21 is drawn into the panel. The latter method comprises the steps of providing an empty panel with one filling port, placing the liquid crystal material 21 in a vacuum ($1 \times 10^{-2}$ to $1 \times 10^{-4}$ Torr) to allow the liquid crystal material 21 to adhere to the filling port, and subsequently restoring the pressure gradually to atmospheric pressure, so that the liquid crystal material 21 is filled in the panel by a pressure difference between the interior and exterior of the liquid crystal panel. Presently, the latter method is used in most of the cases.

Next, after the liquid crystal is filled, the filling port is sealed. Then, polarizing plates 24a and 24b are laminated to the outside surfaces of the substrates 1 and 16, respectively, whereby a liquid crystal panel is completed, which can be irradiated by light emitted from the back light through the first substrate 1 and second substrate 16.

In order to achieve high definition, the liquid crystal panel of this type has to increase the density of the pixels. However, because the conventional liquid crystal panel having the color filter 11 and black matrix 9 formed on the counter substrate causes an error in the position alignment during the fabrication procedure, allowance has to be made, which makes it difficult to secure the area (numerical aperture) of the pixel opening as large as possible.

In contrast, a method of forming the color filter and black matrix on the active matrix substrate having thereon formed the switching elements such as TFTs, that is, a so-called CF(Color Filter)-on-TFT, is proposed in Japanese Patent Laid-open Publication Nos. Hei 8-122824 and 9-292633.

In either case of these publications, because the color filter and black matrix are formed on the CF-on-TFT substrate, no allowance is necessary for the position alignment, thereby simplifying the manufacturing procedure while increasing the numerical aperture of the pixel.

With the panel of the CF-on-TFT structure, however, reflection of external light is greater than the conventional liquid crystal display panel, and therefore, there occurs a problem that the display quality deteriorates under bright external light circumstances.

FIGS. 2A and 2B are explanatory views showing external light reflection mechanisms of liquid crystal display panels. The above problem will be explained with reference to FIGS. 2A and 2B. Because ITO has the larger refractive index (n) (n=approx. 2.0) than those of the alignment films 18a and 18b (n=approx. 1.6) and glass substrate (n=approx. 1.4), the reflected components of external light are mainly the reflection from the ITO on the counter substrate and the reflection from the ITO of the pixel electrode 12.

Also, reflection from the scanning lines or signal lines is noticeable. As shown in FIG. 2A, because reflected light passes through the RGB color filter 11 twice in the conventional TFT and CF separation type liquid crystal display panel, reflected light attenuates in a satisfactory manner. On the contrary, as shown in FIG. 2B, reflected light does not attenuate with the color filter 11 in the liquid crystal display panel of the CF-on-TFT structure, and a quantity of reflected light is greater than that of reflected light from the conventional panel.

In particular, the panel of the CF-on-TFT structure has a problem that reflected light of green light having the wavelength $\lambda$=550 nm or so is especially noticeable under bright external light circumstances.

Incidentally, a reflection preventing film is generally provided to reduce the reflection, and Japanese Patent Laid-open Publication Nos. 6-214252 and 10-154817 disclose a technique to take out reflected light effectively by providing the reflection preventing film over and beneath the counter electrode ITO, so that reflection efficiency of the liquid crystal light bulb of the reflecting type is increased.

In this case, however, the reflection preventing film is used to take out the reflected light effectively, and for this reason, dependency on the location of the reflected light, namely the display image, becomes so great that high-quality display performance cannot be achieved unless the refractive index and film thickness of the reflection preventing film are controlled accurately. Therefore, the reflection preventing film has to be made of an inorganic material by means of sputtering or the like, which poses a problem that an additional step is added to the manufacturing procedure of the liquid crystal display.

As has been discussed and shown in FIG. 2B, with the liquid crystal display panel of the CF-on-TFT structure having the color filter 11 formed on the TFT substrate, reflection of external light from ITO on the counter substrate and the ITO of the pixel electrode 12, or reflection from the signal lines and scanning lines is noticeable in comparison with the conventional TFT and CF separation type liquid crystal display panel shown in FIG. 2A, and in order to meet recent demand of high-quality image of the high density structure, deterioration of the image quality caused by the reflection particularly from the scanning lines and signal lines has to be prevented.

Further, in providing the reflection preventing film over and beneath ITO to prevent the deterioration of the image quality, a film of an inorganic material having predetermined refractive index and film thickness has to be formed by means of sputtering or the like, which results in a problem that an additional step is added to the manufacturing procedure of the liquid crystal display panel.

SUMMARY OF THE INVENTION

It is therefore an object of the present invention to provide a panel of the CF-on-TFT structure having an excellent display quality with less reflection of external light, and a manufacturing method of the same as well as a liquid crystal display.

A color liquid crystal display panel of the present invention includes: a first substrate; pixel electrodes, formed on the first substrate, for forming individual pixels; thin film transistors, formed on the first substrate, for functioning as switching elements for the individual pixels; a passivation film formed to cover the thin film transistors; a black matrix and a color filter formed over the passivation film; an overcoat layer formed to cover the black matrix and color filter; a second substrate provided to oppose the first substrate; a transparent common electrode formed on the second substrate; a sealing material for laminating the first substrate and second substrate at their respective frame portions; a liquid crystal material filled in a space between the first substrate and second substrate; and a mechanism or a member for shifting a wavelength of reflected light of incident light to a shorter wavelength side.

It is preferable that the shifting mechanism or shifting member sets retardation of a space distance sandwiched between the first substrate and second substrate and refractive index anisotropy of the liquid crystal material filled in the space closer to blue.

Also, an in-plane spacer may be used to maintain the space distance sandwiched between the first substrate and second substrate.

Further, a transparent resist film may be used at an in-plane to maintain the space distance sandwiched between the first substrate and second substrate.

Furthermore, an accumulation portion of the color filter may be formed at an in-plane to maintain the space distance sandwiched between the first substrate and second substrate.

In addition, for example, a fluorine liquid crystal mixture is used as the liquid crystal material filled in the space sandwiched between the first substrate and second substrate.

Also, the transparent resist film formed at the in-plane may be formed on the first substrate.

Moreover, the accumulation portion of the color filter formed at the in-plane is formed on the first substrate, for example.

A manufacturing method of a color liquid crystal display panel of the present invention comprises the steps of: forming a plurality of thin film transistors and a wiring layer on a first substrate; forming a passivation film entirely over the first substrate to cover the thin film transistors and wiring layer; forming a black matrix at least over a semiconductor layer in the thin film transistors and a frame at a circumference portion of the substrate; forming a color filter layer; forming an overcoat layer entirely over the first substrate to cover the black matrix and color filter layer; forming a pixel electrode by providing a contact through hole to the overcoat layer; providing a sealing material at a circumference portion on a thin film transistor surface of the first substrate; laminating a second substrate provided with a transparent common electrode to the first substrate with the sealing material in such a manner that the transparent common electrode opposes the thin film transistor surface of the first substrate; and filling a liquid crystal material in a space between the laminated substrates.

In this case, it is preferable that retardation of a space distance sandwiched between the first substrate and second substrate and refractive index anisotropy of the liquid crystal material filled in the space is set closer to blue.

Also, for example, in-plane spacers are scattered in the space between the first substrate and second substrate to maintain the space distance sandwiched between the first substrate and second substrate.

Further, a transparent resist film may be formed at an in-plane on the first substrate by means of photolithography to maintain the space distance sandwiched between the first substrate and second substrate.

Furthermore, an accumulation portion of the color filter layer may be formed at an in-plane on the first substrate by means of photolithography, printing, or electro-deposition to maintain the space distance sandwiched between the first substrate and second substrate.

Also, a fluorine liquid crystal mixture may be used as the liquid crystal material filled in the space sandwiched between the first substrate and second substrate.

According to the color liquid crystal display panel and the manufacturing method of the same, in a color liquid crystal display panel of a CF-on-TFT structure having a black matrix and a color filter formed on a TFT substrate, reflected light of external light from a pixel electrode ITO can be reduced by selecting and controlling a gap (d) of the CF-on-TFT panel and refractive index anisotropy (Δd) of a liquid crystal material by exploiting the presence of wavelength dependency between retardation (Δnd) and light transmittance. Consequently, a liquid crystal display of a CF-on-TFT structure with less reflection can be provided without providing a reflection preventing film.

A liquid crystal display of the present invention displays an image by using the foregoing color liquid crystal display panel.

Also, another liquid crystal display of the present invention displays an image by using the color liquid crystal display panel manufactured by the foregoing manufacturing method of a color liquid crystal display panel.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENT

The following description will describe in detail one embodiment of the present invention with reference to the accompanying drawings.

First Embodiment
(1) Explanation of Arrangement

FIGS. 3 through 8 show a first embodiment of a panel (CF-on-TFT panel) of the present invention fabricated by forming a black matrix and a color filter on a TFT substrate of a color liquid crystal display panel made of a transparent insulating substrate having thereon formed a plurality of thin film transistors using amorphous silicon.

Figure 1:
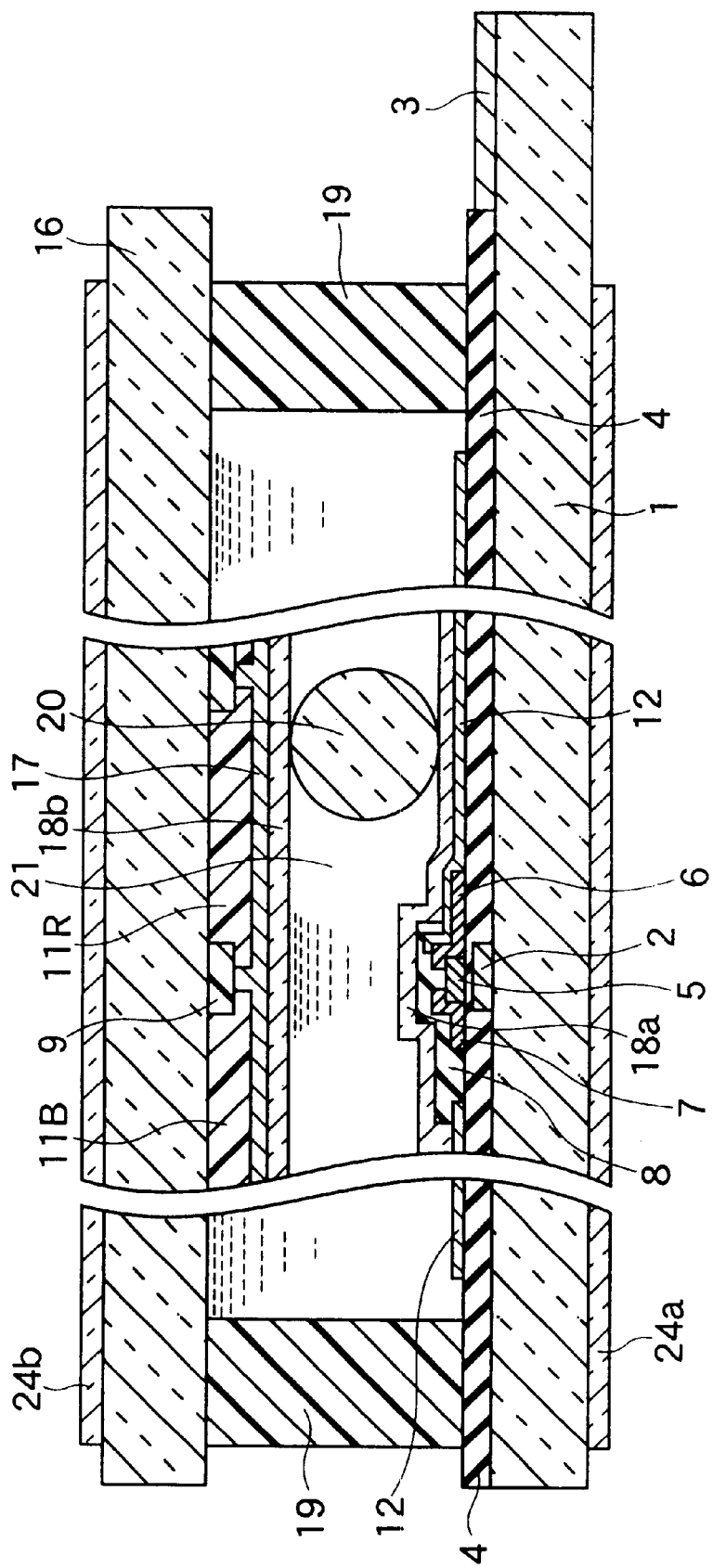
FIG. 1 is a cross section of a conventional liquid crystal display panel.
Figure 2A:
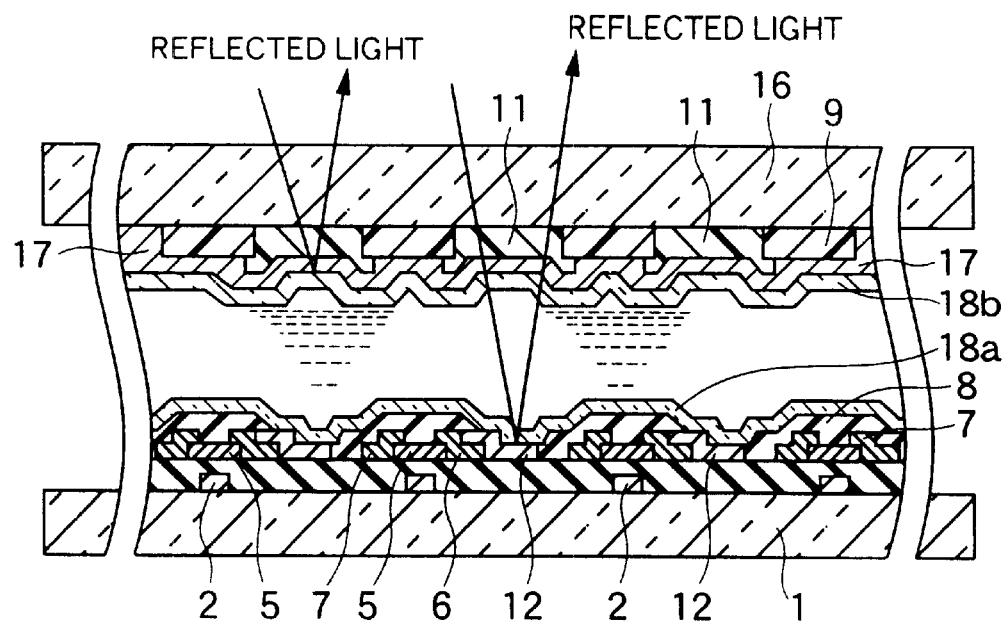
FIGS. 2A and 2B are explanatory views showing external light reflection mechanisms of liquid crystal display panels.
Figure 2B:
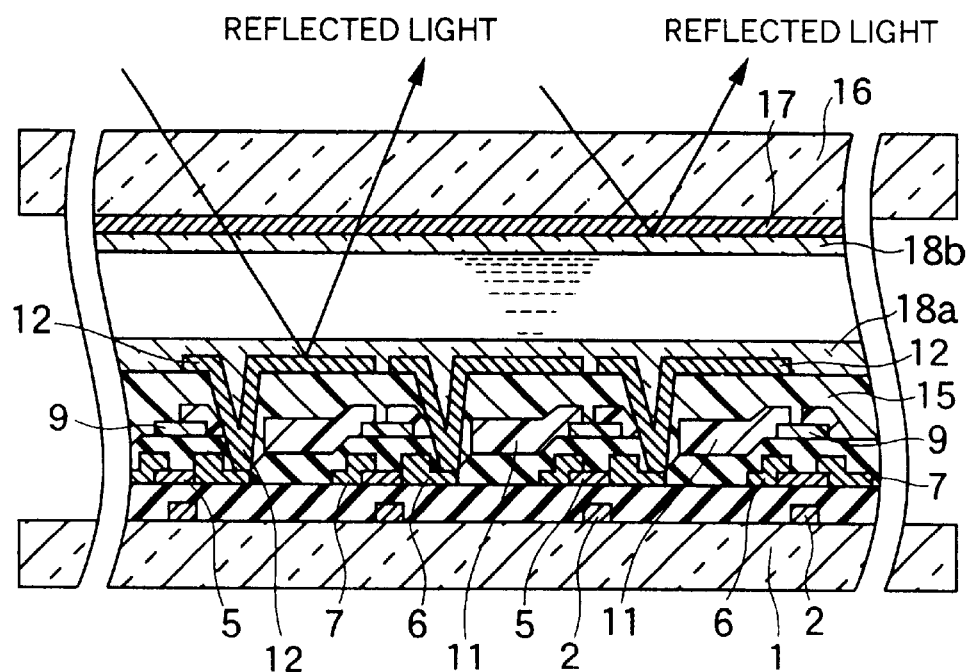
Figure 3:
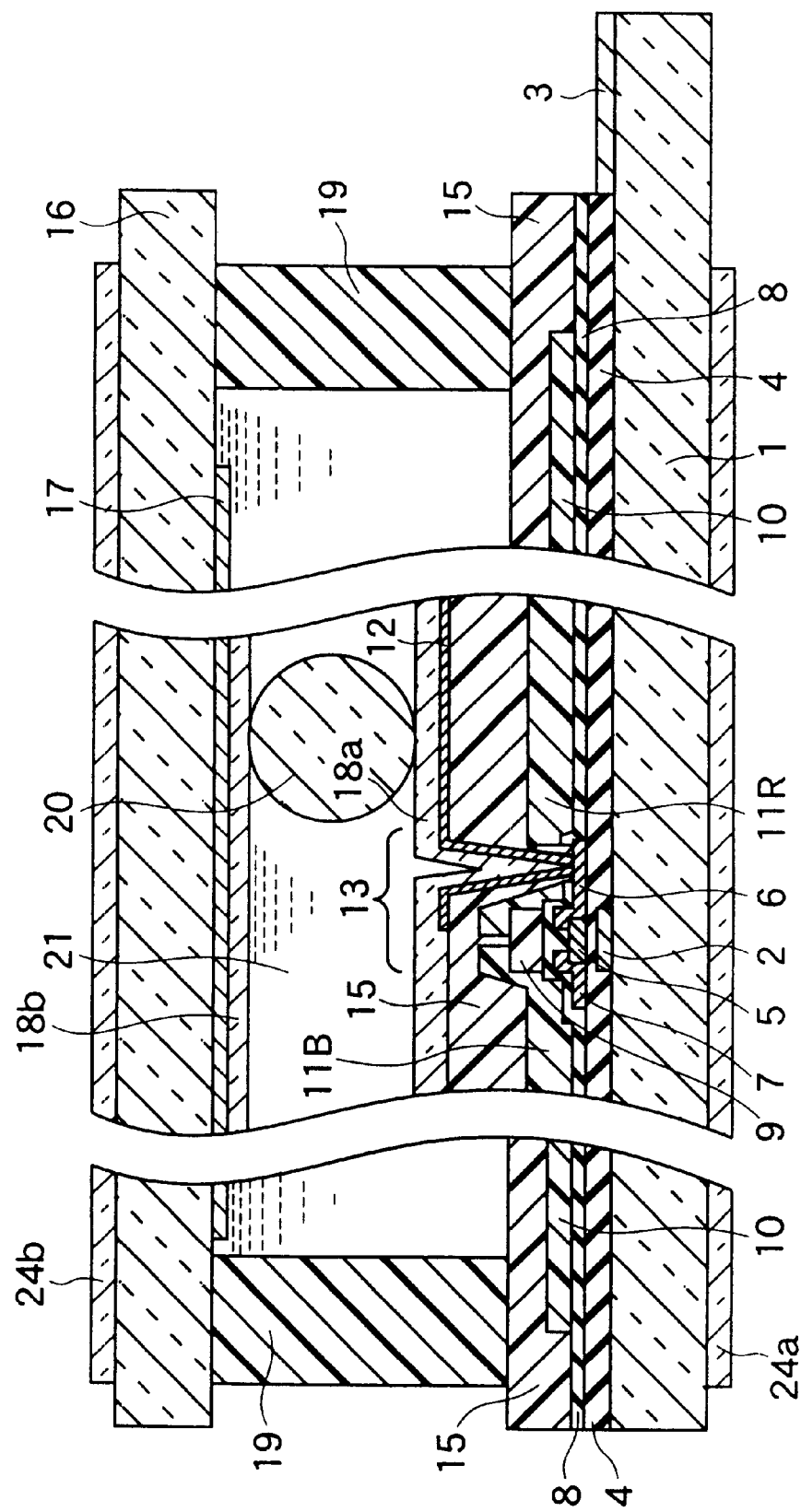
FIG. 3 is a cross section of a liquid crystal display panel in accordance with one embodiment of the present invention.
Figure 4:
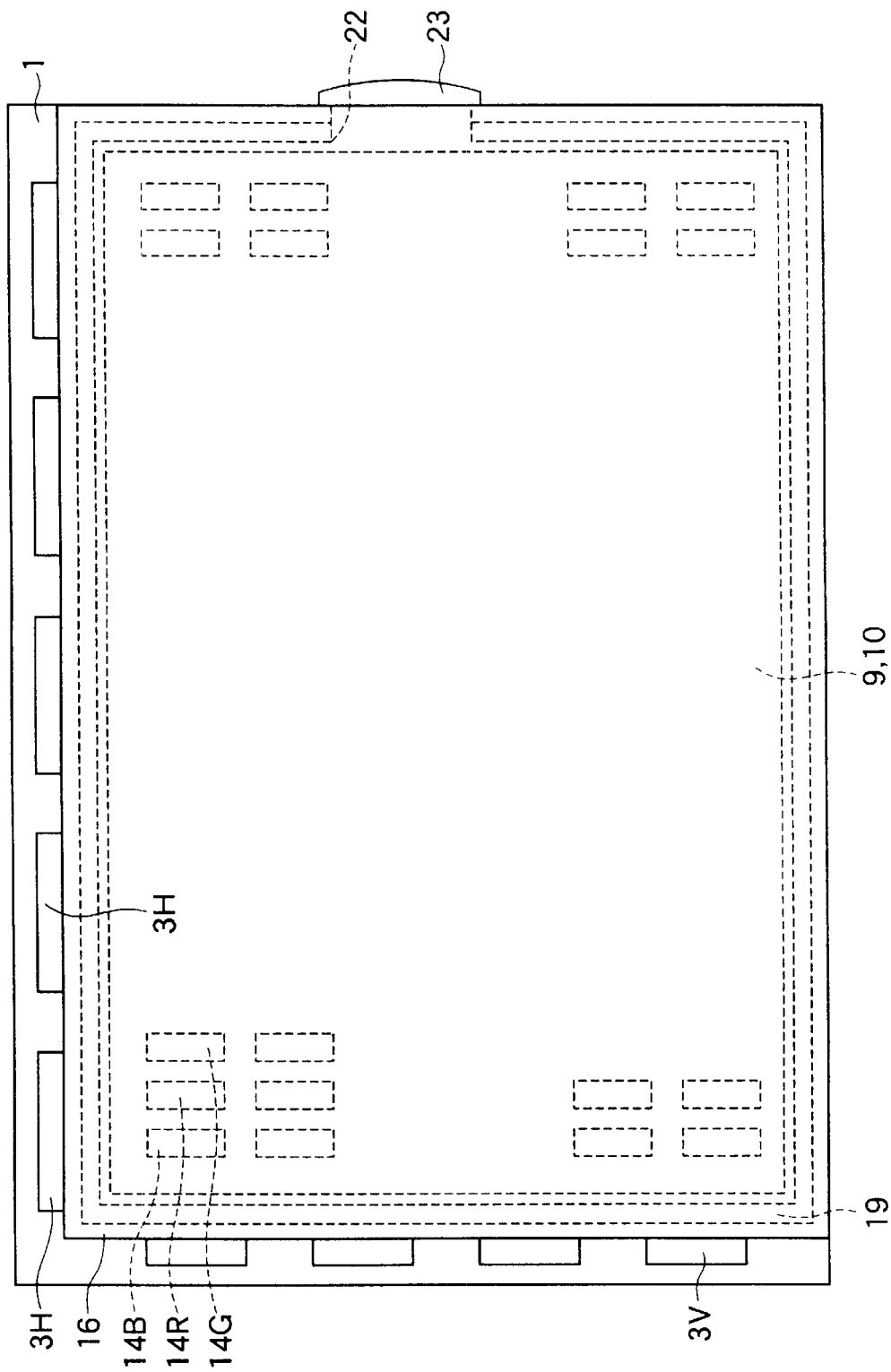
FIG. 4 is a general view of the liquid crystal display panel in accordance with one embodiment of the present invention.
Figure 5:
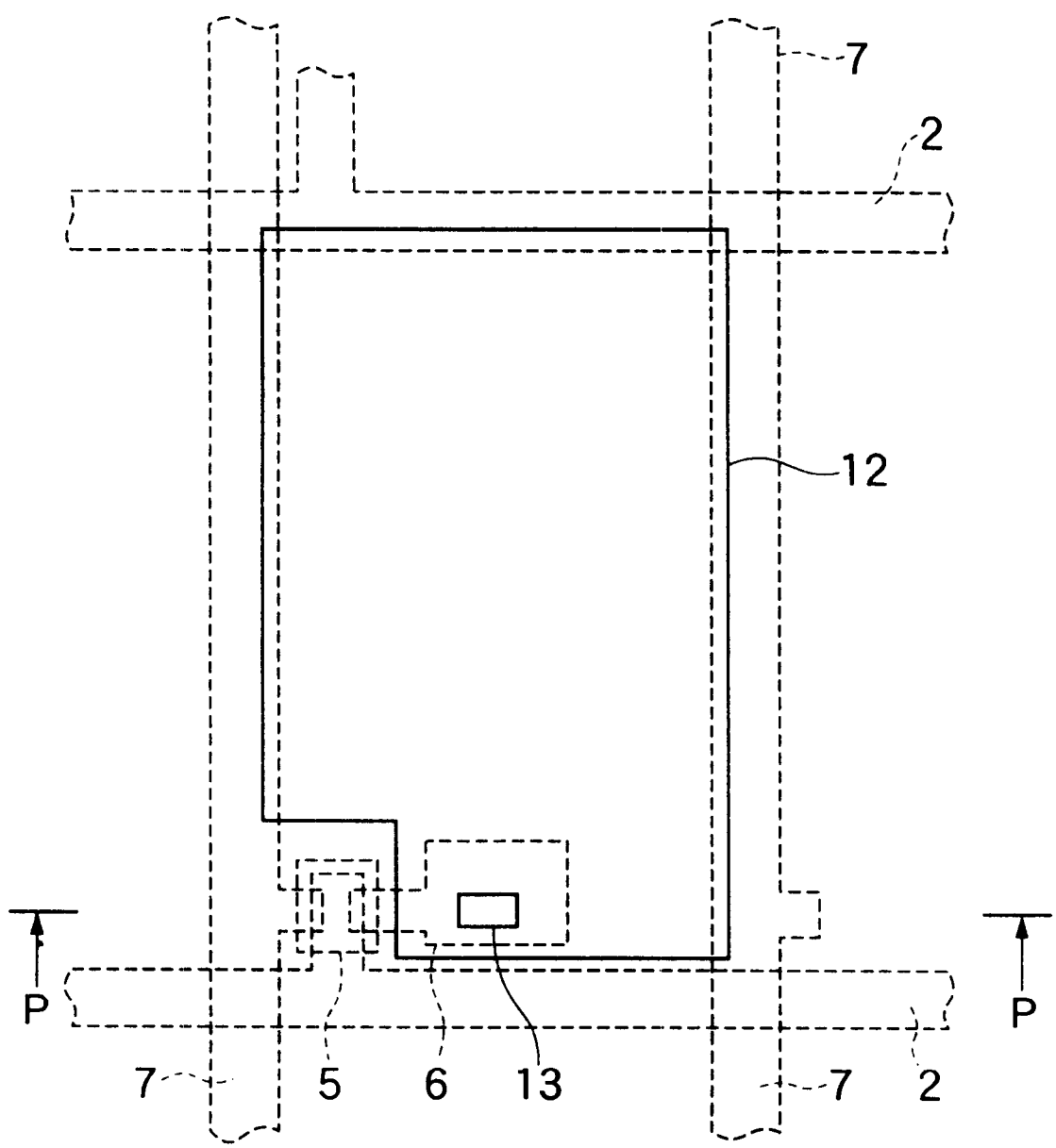
FIG. 5 is a plan view showing a pixel portion of the liquid crystal display panel in accordance with one embodiment of the present invention.
Figure 6:
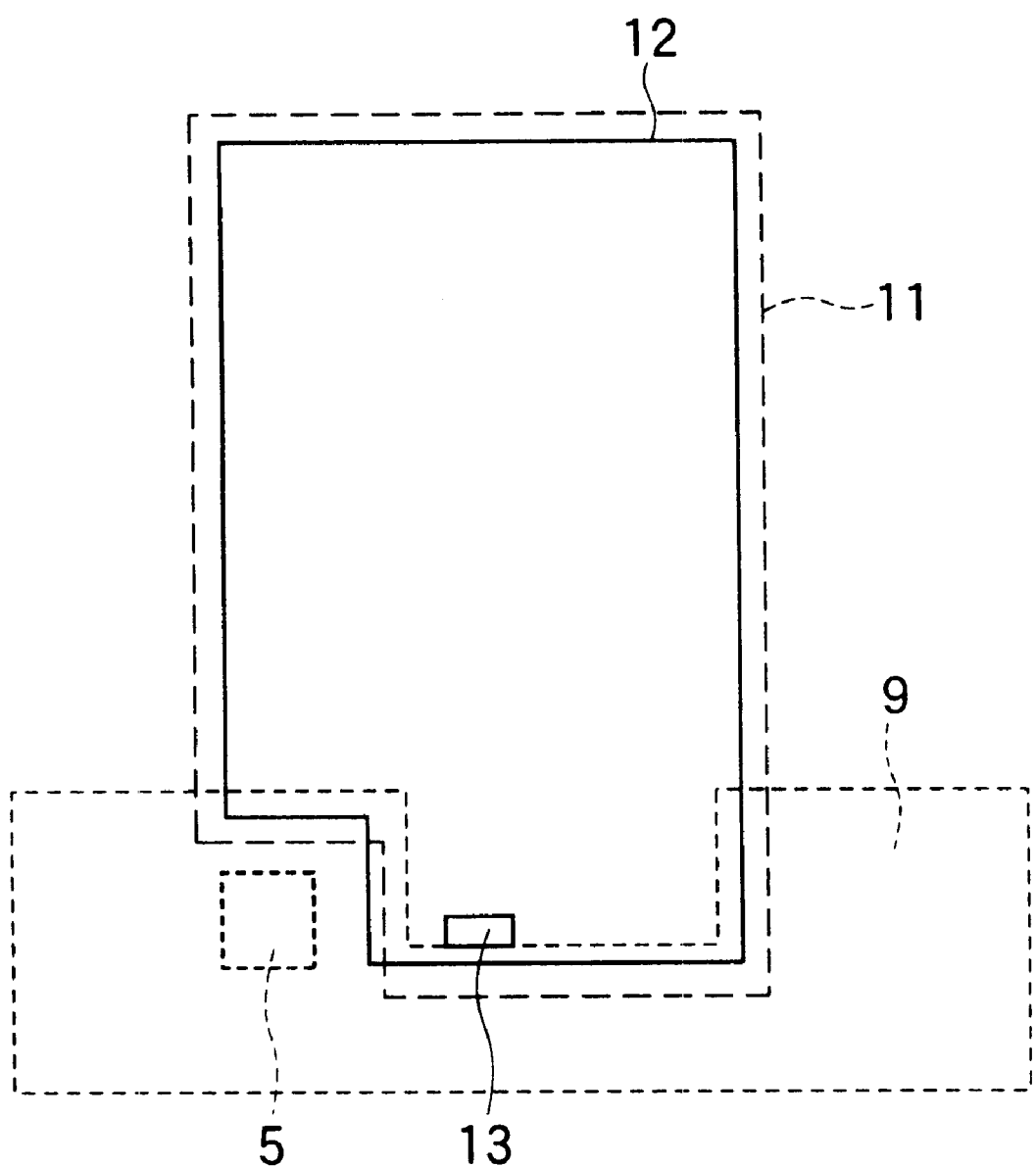
FIG. 6 is a detailed plan view showing the pixel portion of the liquid crystal display panel in accordance with one embodiment of the present invention.

FIG. 3 is a cross section also showing the end portion of the panel (CF-on-TFT panel), in which a black matrix 9 and a color filter 11 are formed on a TFT substrate 1 of the color liquid crystal display panel. FIG. 4 is a plan view showing the entire panel of the CF-on-TFT structure of the present embodiment, and FIGS. 5 and 6 are plan views showing a pixel portion of the panel. Also, FIG. 3 is a cross section across the panel edge portions taken along a line P—P of FIG. 5. In addition, FIGS. 7A through 7C and FIGS. 8A through 8D are cross sections showing the flow of the manufacturing procedure of the color liquid crystal display panel of the present embodiment.

In FIG. 3, a switching TFT is composed of a gate electrode 2 and a gate insulating film 4 formed on the first substrate 1, and a source electrode 6 and a drain electrode 7 formed on the gate insulating film 4. After a passivation film 8 is formed over the switching TFT, the black matrix 9 is formed and color filters 11B and 11R are formed out of negative-type photosensitive color resist of a transparent resist film so as to cover the black matrix 9 partially. An overcoat layer 15 is formed over the color filters 11B and 11R and black matrix 9. In addition, a contact through hole 13 electrically connecting a pixel electrode 12 to the source electrode 6 of the TFT is provided, and after the pixel electrode 12 is formed, a polyimide alignment film 18a is formed, whereby the first substrate 1 of the CF-on-TFT structure is fabricated. On the other hand, the other second substrate 16 (hereinafter, also referred to as the counter substrate) is provided with a counter transparent common electrode 17 on the surface facing the first substrate 1. A polyimide alignment film 18b is formed over the transparent common electrode 17. The first substrate 1 and second substrate 16 form a liquid crystal panel in such a manner that the switching TFT and transparent common electrode 17 oppose each other, and a liquid crystal material 21 is sealed therein by applying a sealing material 19 at the circumference of the liquid crystal panel while maintaining a constant distance between the two substrates 1 and 16 by a spherical spacer 20. Polarizing plates 24a and 24b are provided on the outside surfaces of the substrates 1 and 16, respectively.

FIG. 4 is a plan view of the liquid crystal panel seen from the visual recognition side, and shows terminals 3H and terminals 3V respectively provided at the horizontal end and vertical end of the circumference portion of the first substrate 1, second substrate 16, the sealing material 19 for connecting the first substrate 1 and second substrate 16, a liquid crystal filling port 22, and an end-sealing agent 23 made of UV curable acrylate resin or the like for clogging the liquid crystal filling port 22. In addition, pixel openings 14R, 14G, and 14B are provided to the black matrix 9 and also provided to a black matrix 10 formed at the circumference portion, and FIG. 4 schematically shows a plan view of the portion of the black matrixes 9 and 10 in the cross section of FIG. 3.

FIG. 5 is a plan view of one pixel, and shows a semiconductor layer 5 over the gate electrode 2, source electrode 6, and through hole 13 electrically connecting the pixel electrode 12 to the source electrode 6. The drain electrode 7 and gate electrode 2 cross with each other and most of the pixel electrode 12 is the display region. A mono-color filter 11 (not shown in FIG. 5, but shown in FIG. 6) is formed below the pixel electrode 12, and the black matrix 9 (see FIG. 6) is formed above the semiconductor layer 5.

FIG. 6 is a plan view showing one pixel to illustrate the shape of the black matrix 9, and shows the black matrix 9, pixel electrode 12, through hole 13 for the pixel electrode 12, semiconductor layer 5, and color filter 11 corresponding to the pixel electrode 12.

With the above-arranged liquid crystal panel, in order to reduce reflected light of incident light on the display screen, the refractive index of the liquid crystal material 21 and a gap between the first substrate 1 and second substrate 16 are important. This will be explained more in detail below.

(2) Explanation of the Manufacturing Method

With the above-arranged liquid crystal panel, the refractive index anisotropy ($\Delta n$) of the used liquid crystal material 21 and a distance (d) between the first substrate 1 and second substrate 16 are important for the reflected light of incident light on the display screen, and the following description will describe in detail the manufacturing method of the liquid crystal panel of the present embodiment.

Figure 7A:
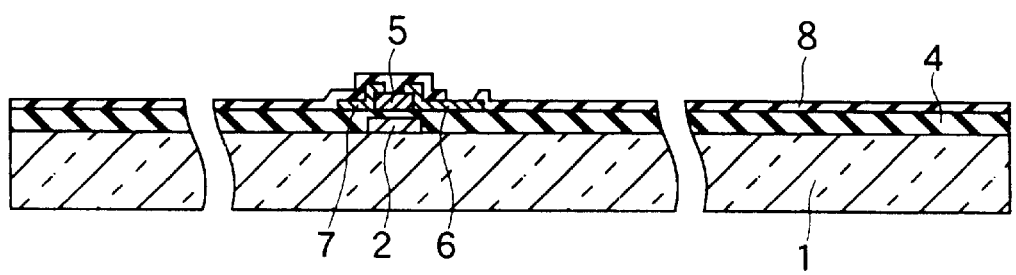
FIGS. 7A through 7C are cross sections showing the procedure of the liquid crystal display panel in accordance with one embodiment of the present invention.

Initially, in FIGS. 3 and 7A, the TFT composed of the gate electrode 2, source electrode 6, and drain electrode 7 is formed on the first substrate 1 which is made of a transparent insulating material, such as non-alkaline glass of 0.7 mm or 1.1 mm thick. In order to form the TFT, a film of a metal material, such as aluminum (Al), molybdenum (Mo), or chromium (Cr), with a film thickness ranging from 100 to 400 nm is formed on the first substrate 1 by means of sputtering, for example, and the gate electrode 2 of a desired shape and the V-end terminals 3V shown in FIG. 4 are patterned by means of photolithography.

As shown in FIG. 7A, an accumulation film, such as a silicon nitride film (SiN), with a film thickness ranging from approximately 100 to 200 nm is formed over the gate electrode 2 and first substrate 1 as the gate insulating film 4 by means of CVD (Chemical Vapor Deposition), etc. Then, a film of amorphous silicon with a thickness of approximately 400 nm is formed over the gate insulating film 4 as the semiconductor layer 5, and patterned into a desired shape.

Next, a film of a metal material, such as Al, Mo, or Cr, is formed with a film thickness ranging from 100 to 400 nm by means of sputtering, for example, and patterned into a desired electrode shape by means of photolithography so as to be made into the source electrode 6, drain electrode 7, and H-end terminals 3H shown in FIG. 4 and serving as the data terminal portion.

Further, a film of silicon nitride with a film thickness ranging from approximately 100 to 200 nm is formed as the passivation film 8 that covers all the foregoing components. Besides the inorganic material, such as silicon nitride, the passivation film 8 can be also made out of transparent resin materials, such as epoxy resin or acrylic resin.

Figure 7B:
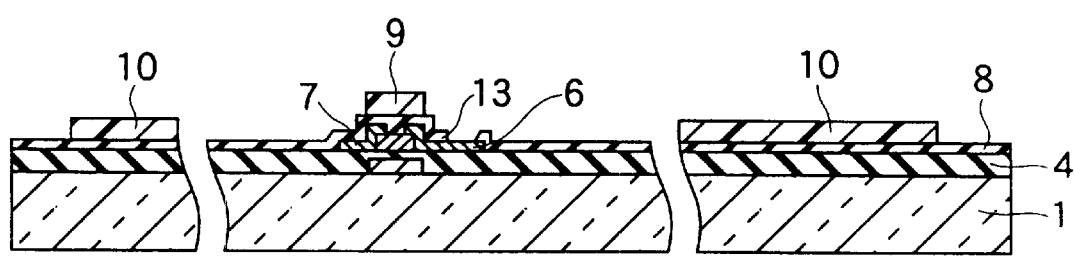

Next, as shown in FIG. 7B, the following description will describe the arrangement and manufacturing method of the black matrix 9 and color filter 11 formed on the TFT substrate.

In order to block light to the semiconductor layer 5, the black matrix 9 is patterned over the TFT substrate. At the same time, the frame black matrix 10 is formed over the gate insulating film 4 at the circumference of the panel so as to prevent light from leaking through the circumference of the panel. The black matrixes 9 and 10 are formed by coating negative-type photosensitive acrylic resist with a light-blocking pigment dispersed therein (for example, the one commercially known as OPTMER CR series of JSR Corporation) or a carbon resist material, and patterning them into a desired shape by exposure, development, and baking. Here, the film is made to have a film thickness ranging from approximately 1 to 3 $\mu$m. The properties required to the preferable black matrixes 9 and 10 are: optical density (OD value) of 3 or greater and a sheet resistance value of $10^{10}\Omega$/sq. or greater.

The spin coating revolutions in coating the black matrixes 9 and 10 vary with the viscosity of the resist, and in the present embodiment, a film having a film thickness ranging from 1 to 3 $\mu$m is obtained by means of spin coating using the resist having the viscosity ranging from 5 to 10 cP at the revolutions ranging from 500 to 1500 rpm for approximately 10 seconds.

After the resist coating, pre-baking is applied to the resist on a hot plate at 90° C. for two minutes to remove the solvent from the resist. The ghi mixed rays (UV rays) are used for the exposure with a quantity of exposure ranging from 300 to 500 mJ/cm$^2$.

After the exposure, development is carried out with a 0.4 mass percent TMAH (tetramethyl ammonium hydroxide) developer including surfactant, whereby the resist is patterned into a desired shape. The developer is used at normal temperature and the development is carried out by means of spin development for 60 to 120 seconds.

Next, the black matrixes 9 and 10 are cured by means of baking in a clean oven at 220° C. for 60 minutes. It should be appreciated that the coating method is not limited to the aforementioned spin coating, and other coating methods, such as slit and spin method, bar coat method, and offset printing method, can be adopted as well.

Also, as the pre-treatment of the coating of the black matrixes 9 and 10, the TFT substrate may be rinsed with UV rays or $O_3$. It is readily understood that, by applying this pre-treatment, an organic material on the surface of the substrate is decomposed and adhesion of the black matrixes 9 and 10 can be improved further. In addition, a hole is made through at a portion in the color filter 11R by patterning, so that it will be used as the through hole 13.

Figure 7C:
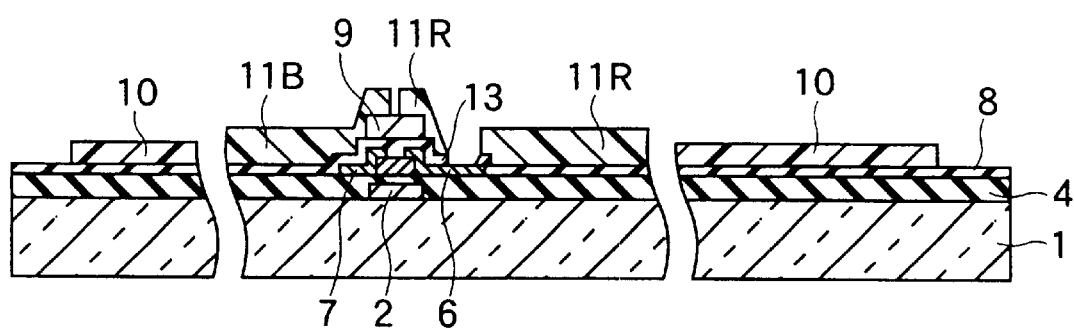

Next, as shown in FIG. 7C, the R, G, and B of the color filter 11 are formed in each pixel. For example, negative-type photosensitive color resist made of acrylic resin with a red (R) pigment dispersed therein (for example, the one commercially known as OPTMER CR series of JSR Corporation) is coated over the substrate by means of spin coating in the same manner as the black matrixes 9 and 10. The spin revolutions are adjusted such that a film thickness ranges from approximately 1.0 to 1.5 $\mu$m.

Next, following the pre-baking and exposure, development is carried out, whereby the desired red color filter 11R is formed in the pixel portion. Here, an opening is provided in a region where the contact through hole 13 that electrically connects the source electrode 6 to the pixel electrode 12 will be formed in a later step. The opening should be large enough to include at least the contact through hole 13.

Next, the red color filter 11R is cured by means of baking. Subsequently, the green (G) color filter 11G and blue (B) color filter 11B are formed in the same manner. The color filters 11 of their respective colors only have to be formed sequentially adjacent to the black matrixes 9 and 10, and the order of the formation is not especially limited. The order of formation of the color filters 11 of their respective colors and the black matrixes 9 and 10 is not especially limited, either.

In the general view of FIG. 4, the pixel openings for three colors are denoted as 14R, 14G, and 14B, respectively.

Figure 8A:
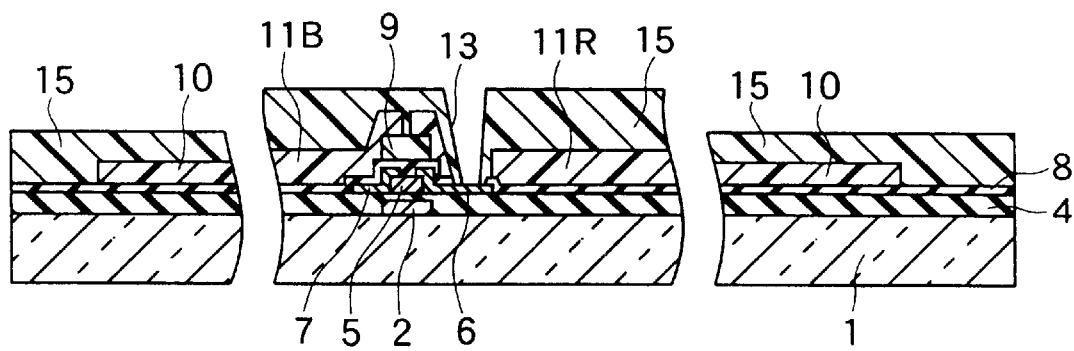
FIGS. 8A through 8D are cross sections showing steps of the manufacturing procedure subsequent to the procedure in FIG. 7.

Next, as shown in FIG. 8A, in order to flatten the black matrixes 9 and 10 and the color filters 11R, 11G, and 11B, the overcoat layer 15 is formed by coating novolak positive-type photosensitive resist (for example, the one commercially known as OPTMER PC series of JSR Corporation), shaping the same into a pattern having an opening at the contact through hole 13 portion by exposure and development, and curing the same by baking at 220° C. for 60 minutes. The overcoat layer 15 has substantially the same thickness on the color filter 11 and the black matrix 10 at the circumference portion, thereby omitting a step of dividing the overcoat layer 15 according to patterns.

Figure 8B:
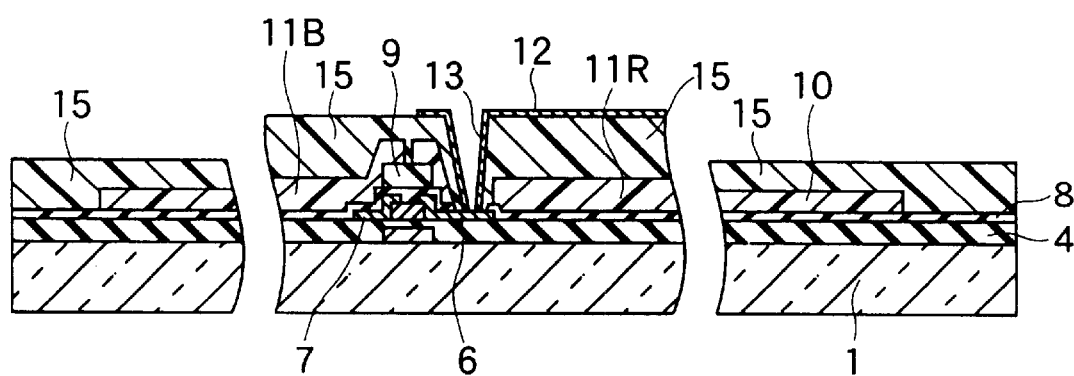

Next, as shown in FIG. 8B, a transparent conductive film, such as ITO, is formed over the overcoat layer 15 and the source electrode 6 exposed from the contact through hole 13 by means of sputtering, and the film is patterned to form the pixel electrode 12. The thicker the film thickness of the transparent conductive film, the better the coverage becomes. This stabilizes electrical connection with the source electrode 6, but when the working properties of the ITO film used as the transparent conductive film are concerned, an adequate film thickness is in a range from approximately 60 to 120 nm. In this manner, a so-called CF-on-TFT substrate is manufactured, in which the black matrix 9 and color filter 11 are formed on the TFT substrate.

Next, the following description will describe the arrangement and manufacturing method of the counter substrate 16. The counter substrate 16 is formed by forming the counter transparent common electrode 17 made of ITO and having a film thickness ranging from, for example, 80 to 150 nm on the second substrate 16 made of a transparent insulating material, such as non-alkaline glass having a thickness of 0.7 mm or 1.1 mm, by means of sputtering.

Next, the following description will describe the arrangement and manufacturing method of the CF-on-TFT panel by laminating the CF-on-TFT substrate to the counter substrate 16 formed respectively in the above-described manners.

Figure 8C:
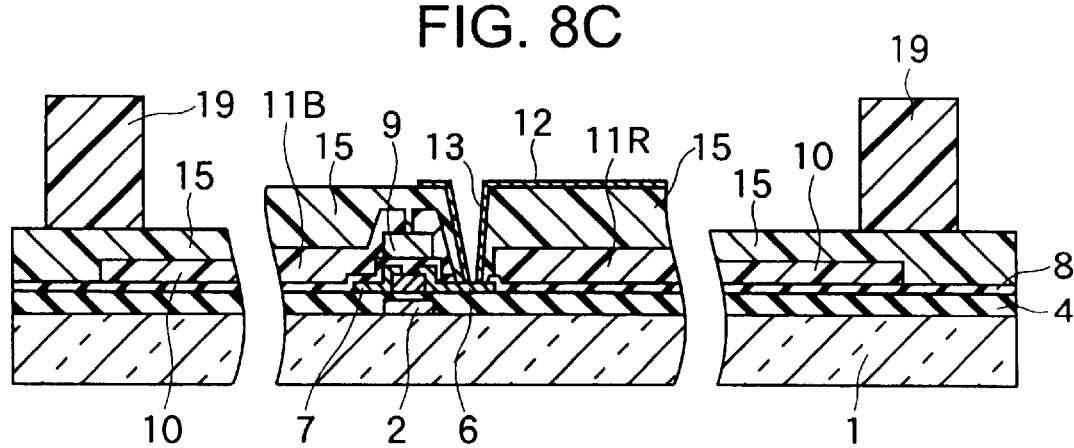
Figure 8D:
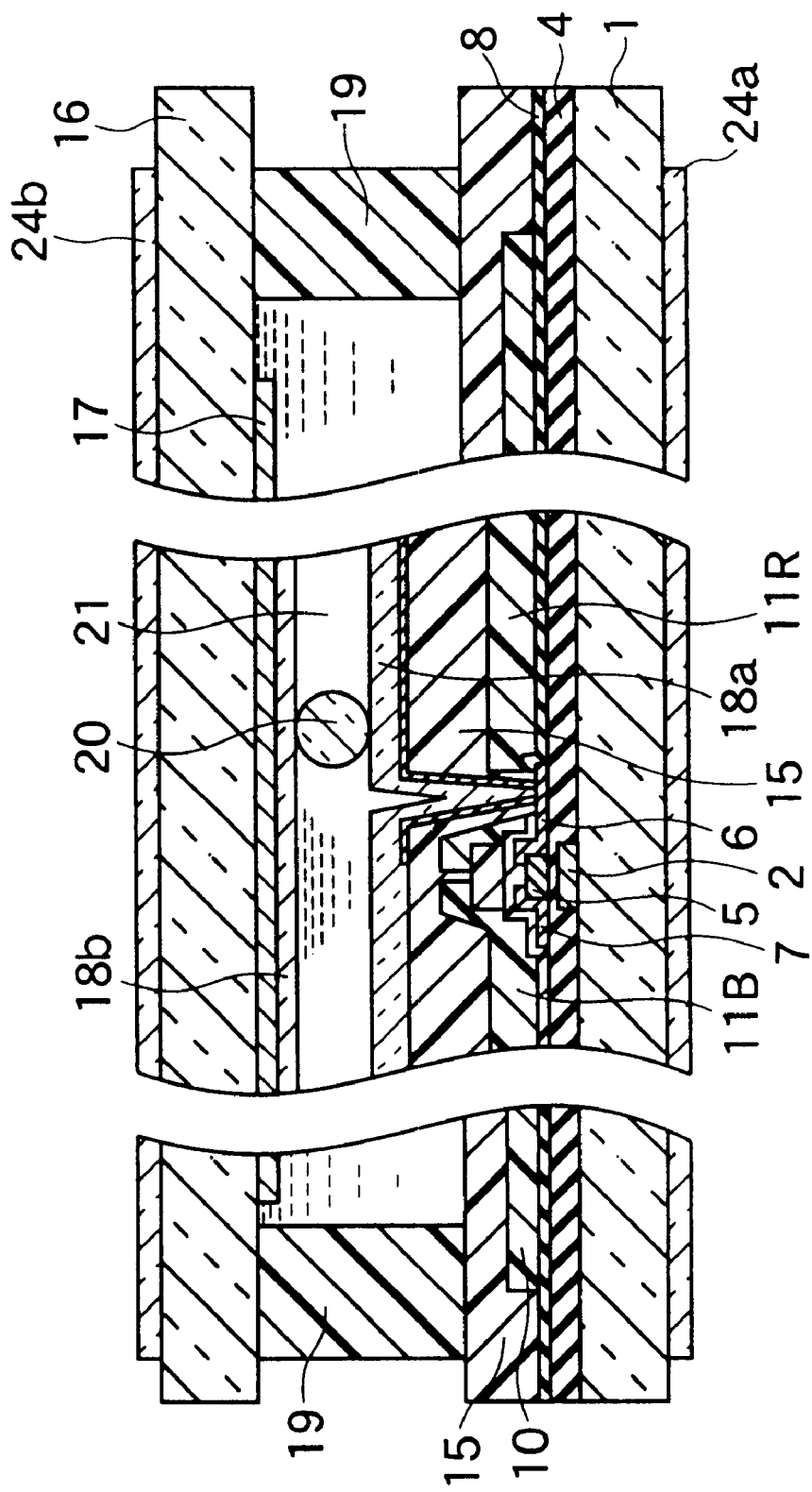

As shown in FIG. 8D, the polyimide alignment film 18a (for example, the one commercially known as SUNEVER series of Nissan Chemical Industries, Ltd., or OPTMER AL series of JSR Corporation) is applied on the entire surface of the first substrate 1 of the CF-on-TFT structure to have a film thickness ranging from 40 to 70 nm by means of spin coating or offset printing, and baked under the temperature condition of 220° C. for 60 minutes.

Next, rubbing is applied in one direction to the surface layer of the alignment film 18a that is formed to obtain a desired pre-tilt angle. The rubbing is applied by bringing a rubbing roll wrapped with conductive synthetic fibers, such as viscose rayon, into physical contact with the alignment film 18a while adjusting the pushing depth, rotating rate, rotating direction, and angle of the roll.

Next, as shown in FIG. 8C, the sealing material 19 is formed at the circumference portion of the substrate 1 by means of screen printing, dispenser coating or the like.

For instance, an epoxy resin bonding agent (for example, the one commercially known as STRUCTBOND series of Mitsui Chemicals) can be used as the sealing material 19. The width of the sealing material 19 is not especially regulated as long as it is wide enough to attain a sufficient laminating strength with the counter substrate 16 and prevent leakage of the filled liquid crystal. Herein, approximately 1.5 mm is given as the finishing width. Also, circumference spacers (not shown) made of bar glass fibers having a diameter ranging from 5 to 7 $\mu$m and referred to as micro rods are dispersed in the sealing material 19.

Next, as shown in FIG. 8D, a transfer (not shown) made of epoxy resin including silver powder is dispensed at each of the four corners of the sealing material 19, and the sealing material 19 is laminated to the counter substrate 16 formed separately, after which heat treatment is applied to cure the sealing material 19. As is with the substrate 1, the alignment film 18b is formed over the counter substrate 16, and the rubbing is applied thereon. When the substrate 1 of the CF-on-TFT structure and the counter substrate 16 are laminated, the in-plane spacers 20 are scattered over the counter substrate 16, so that a predetermined gap is secured between the substrates 1 and 16.

Herein, so-called spherical micro pearls made of a divinylbenzene crosslinked polymer is used as the in-plane spacers 20.

In consideration of the relation between retardation ($\Delta$nd) and optical properties, such as light transmittance, $\Delta$nd=0.42 or so is given as the gap (panel gap) between the substrates 1 and 16. In other words, if the refractive index anisotropy ($\Delta$n) of the used liquid crystal material is approximately 0.076, then the optimal panel gap (d) is ($\Delta$nd/$\Delta$n=) approximately 5.5 $\mu$m.

However, there is obvious wavelength dependency between the retardation ($\Delta$nd=$\Delta$n×d) and light transmittance. Further, as is disclosed in Japanese Laid-open Patent Application No. 11-142877, a hue of each color perceptible by human and light intensity (visual properties) also depend on the wavelength of light. For example, transmitting light or reflected light of green is more noticeable than that of blue.

Therefore, in case of the panel of the CF-on-TFT structure, with which reflection of external light from the pixel electrode ITO 12 is more noticeable, reflected light suppressing means is realized by shifting the wavelength of the reflected light to the shorter wavelength side, so that it is not readily recognized by human perception.

In the present embodiment, the retardation ($\Delta$nd) is set in a range from 0.2 to 0.4. More specifically, when a liquid crystal material having $\Delta$n=0.076 is used, approximately 0.3 is given as the retardation ($\Delta$nd), that is, approximately 4.0 $\mu$m is given as the panel gap.

Next, both the substrates 1 and 16 are cut into a desired panel size. Here, as shown in the general view of FIG. 4, the counter substrate 16 is cut smaller than the first substrate 1, so that the H-end terminals 3H in the horizontal end and the V-end terminals 3V in the vertical end will be exposed. However, if the transparent common electrode 17 made of ITO is formed on the cutting line, cutting dusts from the ITO adhere to the terminals 3H and 3V formed on the first substrate 1, thereby causing an unwanted short across the terminals.

Hence, it is preferable to apply patterning in such a manner that the transparent common electrode 17 is not formed on the cutting line. The liquid crystal material 21 is filled in the liquid crystal panel fabricated in this manner. The liquid crystal is filled by means of vacuum filling, by which the liquid crystal panel is placed in a vacuum container which can realize a desired vacuuming degree, then the panel is evacuated so as to bring the liquid crystal material into close contact with the filling port 22 that is not covered with the sealing material 19 as shown in the general view of FIG. 4, and pressure is gradually restored to atmospheric pressure.

In this embodiment, a fluorine compound, such as the one commercially known as LIXON series of Chisso Petrochemical Corporation, is used as the liquid crystal material, and the pressure is restored to atmospheric pressure from the vacuuming degree of about $1 \times 10^{-4}$ Torr by gradually introducing nitrogen gas. After the filling of the liquid crystal, the filling port 22 is clogged with the end-sealing agent 23 made of UV curable acrylate resin or the like.

Finally, the polarizing plates 24a and 24b are laminated to the outside surfaces of the substrates 1 and 16, respectively, whereby the CF-on-TFT panel as shown in FIG. 3 is completed. An iodide polarizing film (for example, the one commercially known as NPF series of Nitto Denko Corporation) is used as the polarizing plates 24a and 24b.

The present embodiment is characterized in that the reflection of external light from the pixel electrode ITO 12 is reduced by controlling the gap (d) of the CF-on-TFT panel and the refractive index anisotropy ($\Delta$n) of the liquid crystal material by exploiting the presence of the wavelength dependency between the retardation ($\Delta$nd) and light transmittance. Consequently, it becomes possible to obtain the liquid crystal display of the CF-on-TFT structure with less reflection without providing a reflection preventing film.

The retardation ($\Delta$nd) is expressed as a multiplied value of the refractive index anisotropy ($\Delta$n) of the liquid crystal material by the gap (d) of the CF-on-TFT panel, and the refractive index (n) of the liquid crystal material 21 is generally around 1.6 while the refractive index anisotropy ($\Delta$n) of the same is generally expressed as $\Delta$n=0.076 as previously mentioned. Although 0.076 is given to $\Delta$n of the liquid crystal material of the fluorine compound, in case that a value as great as 0.1 is given to $\Delta$n, the gap (d) can be smaller, and if a value as small as 0.05 is given to $\Delta$n, the gap (d) can be greater. Consequently, the retardation ($\Delta$nd) can be adjusted in a range from 0.2 to 0.4, thereby making it possible to improve the image quality by controlling the reflected light.

In addition, the gap (d) of the CF-on-TFT panel corresponds to the sealing thickness of the liquid crystal material 21, and in case of FIG. 3, it corresponds to the diameter of one spherical in-plane spacer 20. Thus, if the liquid crystal material 21 is highly viscous, the space gap is secured by scattering a plurality of in-plane spacers 20, thereby realizing an accurate gap length as a distance between the main surfaces of the alignment films 18a and 18b.

With the gap length (d) and refractive index anisotropy ($\Delta$n), the incident light of each of three colors R, G, and B is converted to reflected light in the UV ray region by the wavelength dependency of reflected light with respect to the incident light of external light, so that visual recognition is not affected adversely.

By driving the R, G, and B in the individual pixels separately in the above-described color liquid crystal display panel by a driving circuit, it has become possible to provide a liquid crystal display capable of displaying a high-quality color image without any adverse effect from the reflected light of incident light under the bright external light circumstances. In addition, by manufacturing the color liquid crystal display panel with the retardation (Δnd) set in a range from 0.2 to 0.4 in consideration of the relation between the liquid crystal material 21 and gap length, and connecting the same to the driving circuit to input a data image signal or an RGB signal, a liquid crystal display capable of displaying an image with high definition and high quality can be provided.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A color liquid crystal display panel, comprising:

a first substrate;

pixel electrodes formed on said first substrate and constituting individual pixels;

thin film transistors, formed on said first substrate, operable as switching elements for the individual pixels;

a passivation film formed to cover said thin film transistors;

a black matrix and a color filter formed over said passivation film;

an overcoat layer formed to cover said black matrix and said color filter;

a second substrate provided to oppose said first substrate;

a transparent common electrode formed on said second substrate;

a sealing material for sealing and laminating said first substrate and said second substrate at their respective frame portions, wherein a retardation of a space distance sandwiched between said first substrate and said second substrate and refractive index anisotropy of a liquid crystal material filled in said space distance is optimized to cause suppression of a green light component of a reflected light of an incident light and transmission of a color blue component of said reflected light.

2. The color liquid display panel according to claim 1, further comprising:

an in-plane spacer which maintains said space distance sandwiched between said first substrate and said second substrate.

3. The color liquid crystal display panel according to claim 1, further comprising:

an in-plane transparent resist film formed at an in-plane to maintain said space distance sandwiched between said first substrate and said second substrate.

4. The color liquid crystal display panel according to claim 3, wherein said transparent resist film formed at the in-plane is formed on said first substrate.

5. The color liquid crystal display panel according to claim 1, further comprising:

an accumulation portion of said color filter formed at an in-plane to maintain said space distance sandwiched between said first substrate and said second substrate.

6. The color liquid crystal panel according to claim 5, wherein said accumulation portion of said color filter formed at the in-plane is formed on said first substrate.

7. The color liquid crystal display panel according to claim 1, wherein said liquid crystal material filled in said space distance sandwiched between said first substrate and said second substrate contains a fluorine liquid crystal mixture.

8. The liquid crystal display according to claim 1, wherein said liquid crystal display panel comprises a color liquid crystal display panel for displaying an image.

9. The color liquid crystal display panel according to claim 1, wherein said refractive index anisotropy of said liquid crystal material is 0.076.

10. A manufacturing method of a color liquid crystal display panel, comprising:

forming a plurality of thin film transistors and a wiring layer on a first substrate;

forming a passivation film entirely over said first substrate to cover said thin film transistors and wiring layer;

forming a black matrix at least over a semiconductor layer in said thin film transistors and a frame at a circumference portion of said substrate;

forming a color filter layer over said passivation film;

forming an overcoat layer entirely over said first substrate to cover said black matrix and said color filter layer;

forming a pixel electrode by proving a contact through hole to said overcoat layer;

providing a sealing material at a circumference portion on a thin film transistor surface of said first substrate;

laminating a second substrate provided with a transparent common electrode to said first substrate with said sealing material in such a manner that said transparent common electrode opposes the thin film transistor surface of said first substrate; and optimizing a retardation of a space distance sandwiched between said first substrate and said second substrate and a refractive index anisotropy of a liquid crystal material filled in said space distance causing suppression of a green light component of a reflected light of an incident light and transmission of a color blue component of said reflected light.

11. The manufacturing method of a color liquid crystal display panel according to claim 10, wherein in-plane spacers are scattered in a space between said first substrate and said second substrate to maintain said space distance sandwiched between said first substrate and said second substrate.

12. The manufacturing method of a color liquid crystal display panel according to claim 10, wherein a transparent resist film is formed at an in-plane on said first substrate by photolithography to maintain said space distance sandwiched between said first substrate and said second substrate.

13. The manufacturing method of a color liquid crystal display panel according to claim 10, wherein an accumulation portion of said color filter layer is formed at an in-plane on said first substrate by photolithography, printing, or electro-deposition to maintain said space distance sandwiched between said first substrate and said second substrate.

14. The manufacturing method of a color liquid crystal display panel according to claim 10, wherein said liquid crystal material comprises a fluorine liquid crystal mixture.

15. The method according to claim 10, further comprising:

displaying an image by using the color liquid crystal display panel.

16. A color liquid crystal display panel, comprising:

a first substrate;

pixel electrodes formed on said first substrate and constituting individual pixels;

thin film transistors, formed on said first substrate, operable as switching elements for the individual pixels;

a passivation film formed to cover said thin film transistors;

a black matrix and a color filter formed over said passivation film;

an overcoat layer formed to cover said black matrix and said color filter;

a second substrate provided to oppose said first substrate;

a transparent common electrode formed on said second substrate;

a sealing material for sealing and laminating said first substrate and said second substrate at their respective frame portions; and a liquid crystal material with a refractive index filled in a space distance between said first substrate and said second substrate set up to cause an attenuation of a reflected light and transmission of a transmitted light, wherein a retardation value obtained by multiplying said space distance and said refractive index of anisotropy of said liquid crystal material is in a range of 0.2 to 0.4.

* * * * *

UNITED STATES PATENT AND TRADEMARK OFFICE
CERTIFICATE OF CORRECTION

| | | |
|---|---|---|
| PATENT NO. | : 6,690,446 B1 | Page 1 of 1 |
| APPLICATION NO. | : 09/689901 | |
| DATED | : February 10, 2004 | |
| INVENTOR(S) | : Mamoru Okamoto et al. | |

It is certified that error appears in the above-identified patent and that said Letters Patent is hereby corrected as shown below:

Title Page, Item (56) For. Pat. Docs.

Under REFERENCES CITED at (56):

Add the following references:
  JP06-242433
  JP04-253028
  JP11-095202
  JP09-258162

Signed and Sealed this
Sixth Day of September, 2011

David J. Kappos
*Director of the United States Patent and Trademark Office*